(12) United States Patent
Ramchandran (10) Patent No.: US 11,587,012 B2
(45) Date of Patent: Feb. 21, 2023

(54) CONTINUOUS DATA QUALITY ASSESSMENT AND MONITORING FOR BIG DATA

(71) Applicant: Walmart Apollo, LLC, Bentonville, AR (US)

(72) Inventor: Ravi Ramchandran, Bengaluru (IN)

(73) Assignee: Walmart Apollo, LLC, Bentonville, AR (US)

(*) Notice: Subject to any disclaimer, the term of this patent is extended or adjusted under 35 U.S.C. 154(b) by 259 days.

(21) Appl. No.: 16/389,940

(22) Filed: Apr. 20, 2019

(65) Prior Publication Data
US 2020/0286025 A1 Sep. 10, 2020

(30) Foreign Application Priority Data
Mar. 8, 2019 (IN) .............................. 201941009031

(51) Int. Cl.
*G06Q 10/06* (2012.01)
*G06F 11/30* (2006.01)
(Continued)

(52) U.S. Cl.
CPC ... *G06Q 10/06395* (2013.01); *G06F 11/3075* (2013.01); *G06F 11/3082* (2013.01); *G06F 11/3086* (2013.01); *G06N 5/025* (2013.01)

(58) Field of Classification Search
CPC ............ G06F 11/3075; G06F 11/3082; G06F 11/3086; G06N 5/025; G06N 5/046; G06Q 10/06395
See application file for complete search history.

(56) References Cited

U.S. PATENT DOCUMENTS 7,239,985 B1 7/2007 Hysom et al.
7,831,695 B1 * 11/2010 Burr .................... H04L 41/0813
709/220
(Continued)

FOREIGN PATENT DOCUMENTS

CN 106056287 A 10/2016

OTHER PUBLICATIONS

"Handbook on Data Quality Assessment Methods and Tools", by Bergdahl et al., European Commission, Eurostat, Wiesbaden, 2007. (Year: 2007).*
(Continued)

*Primary Examiner* — Pan G Choy
(74) *Attorney, Agent, or Firm* — Barta, Jones & Foley, PLLC (57) ABSTRACT

A data quality assessment and monitoring tool addresses inconsistency in large data sets from differing sources, determining data quality attributes such as completeness, conformity, validity, and accuracy. Flexible taxonomies and rollup strategies accommodate diverse business unit needs across a complex enterprise, and provides insight into individual entities' performance. An exemplary tool comprises a data importer for importing data from a data lake; a rules manager for generating rules and rule sets; a scoring engine for generating data quality scores; a job manager; a data profiler for running data assessment tasks and collating the data quality scores for a plurality of hierarchical data entity units; a hierarchical scoring aggregator for aggregating sets of data quality scores into a plurality of first tier aggregate data quality scores and to further aggregate the first tier aggregate data quality scores into one or more second tier aggregate data quality scores; and a reporting component.

20 Claims, 6 Drawing Sheets

(51) Int. Cl.
*G06N 5/02* (2006.01)
*G06Q 10/0639* (2023.01)
*G06N 5/025* (2023.01)

(56) References Cited

U.S. PATENT DOCUMENTS

| | | | |
|---|---|---|---|
| 8,341,149 B2 | 12/2012 | Zhang et al. | |
| 8,428,900 B2 | 4/2013 | Wang | |
| 8,874,565 B1* | 10/2014 | Kapoor | G06F 16/31 |
| | | | 707/726 |
| 8,892,534 B2 | 11/2014 | Hamlescher et al. | |
| 8,984,360 B2 | 3/2015 | Al Za'noun et al. | |
| 9,311,363 B1* | 4/2016 | Nordstrom | G06F 16/9535 |
| 9,529,851 B1 | 12/2016 | Smith | |
| 10,272,341 B1* | 4/2019 | Blackwell | A63F 13/67 |
| 10,764,312 B2* | 9/2020 | Wang | G06N 5/025 |
| 2013/0031044 A1* | 1/2013 | Miranda | G06Q 10/063 |
| | | | 706/47 |
| 2013/0232472 A1 | 9/2013 | Korner et al. | |
| 2013/0262035 A1* | 10/2013 | Mills | G06F 16/24568 |
| | | | 702/188 |
| 2014/0324801 A1 | 10/2014 | McGraw et al. | |
| 2016/0070725 A1 | 3/2016 | Marrelli et al. | |
| 2016/0267082 A1* | 9/2016 | Wong | G06F 16/164 |
| 2017/0235848 A1* | 8/2017 | Van Dusen | G06Q 10/10 |
| | | | 705/12 |
| 2018/0052872 A1 | 2/2018 | Marrelli et al. | |
| 2018/0096000 A1* | 4/2018 | Harrison | G06F 16/288 |
| 2019/0361934 A1* | 11/2019 | Rogynskyy | G06F 16/254 |

OTHER PUBLICATIONS

"A Review of Data Quality Assessment Methods for Public Health Information Systems", by Chen et al., School of Information Systems and Technology, Faculty of Engineering and Information Sciences, University of Wollongong, Australia. Int. J. Environ. Res. Public Health 2014, 11, p. 5170-5207. (Year: 2014).*

* cited by examiner

CONTINUOUS DATA QUALITY ASSESSMENT AND MONITORING FOR BIG DATA

BACKGROUND

In enterprise operations that generate and consume large quantities of data from widely-varying sources, data quality can become a significant factor in operational efficiency. However, different uses of the data can be affected in different ways; certain use cases may result in worse adverse effects than others. In a complex enterprise operation, various diverse business unit needs can drive disparate use cases. Unfortunately, this situation can render many data quality determinations subjective, reducing relevance and usefulness to some business unit needs, and negatively impacting enterprise efficiency.

SUMMARY

A disclosed data quality assessment and monitoring tool addresses inconsistency in large data sets from differing sources, determining data quality attributes such as completeness, conformity, validity, and accuracy. Flexible taxonomies and rollup strategies accommodate diverse business unit needs across a complex enterprise, and provides insight into individual entities' performance. An exemplary tool comprises a data importer for importing data from a data lake; a rules manager for generating rules and rule sets; a scoring engine for generating data quality scores; a job manager; a data profiler for running data assessment tasks and collating the data quality scores for a plurality of hierarchical data entity units; a hierarchical scoring aggregator for aggregating sets of data quality scores into a plurality of first tier aggregate data quality scores and to further aggregate the first tier aggregate data quality scores into one or more second tier aggregate data quality scores; and a reporting component.

BRIEF DESCRIPTION OF THE DRAWINGS

The disclosed examples are described in detail below with reference to the accompanying drawing figures listed below.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

In enterprise operations that generate and consume large quantities of data from widely-varying sources, data quality can become a significant factor in operational efficiency. However, different uses of the data can be affected in different ways; certain use cases may result in worse adverse effects than others. In a complex enterprise operation, various diverse business unit needs can drive disparate use cases. For example, business units such as merchandizing, marketing, and finance each use data in significantly different ways and thus imperfections in data can negatively impact the different business units differently. Unfortunately, this situation can render many data quality determinations subjective, reducing relevance and usefulness to some business unit needs, and negatively impacting enterprise efficiency.

Therefore, a disclosed data quality assessment and monitoring tool addresses inconsistency in large data sets from differing sources, determining data quality attributes such as completeness, conformity, validity, and accuracy. Flexible taxonomies and rollup strategies accommodate diverse business unit needs across a complex enterprise, and provides insight into individual entities' performance. An exemplary tool comprises a data importer for importing data from a data lake; a rules manager for generating rules and rule sets; a scoring engine for generating data quality scores; a job manager; a data profiler for running data assessment tasks and collating the data quality scores into dimensional scores for a plurality of hierarchical data entity units; a hierarchical scoring aggregator for aggregating sets of data quality scores into a plurality of first tier aggregate data quality scores and to further aggregate the first tier aggregate data quality scores into one or more second tier aggregate data quality scores; and a reporting component.

A Data Quality Assessment Framework (DQAF) is implemented as a data quality assessment and monitoring tool that computes data quality scores based on various taxonomies and rollup strategies. A set of data quality attributes, identified as data quality dimensions, represents construct of data quality. Examples include completeness, conformity, validity, and accuracy. Completeness is a measure of the presence of core source data elements that, exclusive of derived fields, must be present in order to complete a given business process. Conformity is a measure of a data element's adherence to required formats (data types, field lengths, value masks, field composition, etc.) as specified in either metadata documentation or external or internal data standards. Validity is the extent to which data corresponds to reference tables, lists of values from gold sources documented in metadata, value ranges, etc. Accuracy is a measure of whether the value of a given data element is correct and reflects the real world as viewed by a valid real-world source.

Some measures impact others. For example, accuracy depends upon validity, because data cannot be accurate if it is not valid. Validity, in turn, depends upon conformity because data cannot be valid if it does not conform to standards or expectations. Similarly, conformity depends upon completeness, because missing data cannot conform to any standards or expectations. Additional dimensions include: timeliness, duplication, integrity, consistency, and data decay. Timeliness is a measure of current data available for business use as defined by established service level agreements (SLAs) for delivery or receipt. Duplication is measure of erroneous duplicated records and data elements across or within data stores. Integrity is a measure of the existence of a unique primary key field, as well as a measure of whether foreign keys in one table reference a valid primary key in the respective parent table. Consistency is a measure of data elements or records being equivalent across sources, to include continuity of the data elements and records through its life cycle. Data decay is a measure of how current the data is, to include the frequency at which the data is refreshed or updated.

The scoring also provides a metric to meet requirement of each individual business entities. The DQAF defines customized data quality rules and maps them to various dimensions. It also orchestrates and runs data quality assessment (DQA) jobs on data. A grouped set of these rules are known as data ruleset. Hierarchical data entities are collations of attributes that qualify and represent a business entity. Application programming interfaces (APIs) are provided to interact with data quality elements such as data entity, data rules, data rule sets, metrics, APIs, and others. A DQAF execution engine defines a way to run DQAs as a managed service in a deployment agnostic manner. Some examples are deployed to a cloud. External and/or internal data governance tools run workflows for data quality improvement on a continual basis.

Data profiling is way of improving data quality by identifying, interpreting and validating data patterns and formats from various sources. Data profiling identifies gaps between actual data and expected data. Profiling is usually accomplished using a combination business rules and data quality rules. The DQAF provides a flexible framework to perform DQAs and reports data quality scores based on various taxonomies and rollup strategies. The data quality scores are then propagated to a dashboard, which provides an objective view of data quality over various dimensions. DQAF metrics can then be leveraged for correction workflows and used for remediation efforts. The DQAF allows stewards to flexibly define and customize data quality rules, map them to various dimensions, and orchestrate and run DQA jobs on the relevant data. Some examples interface with external or internal data governance tools, to run workflows for data quality improvement on a continuous basis.

Figure 1:
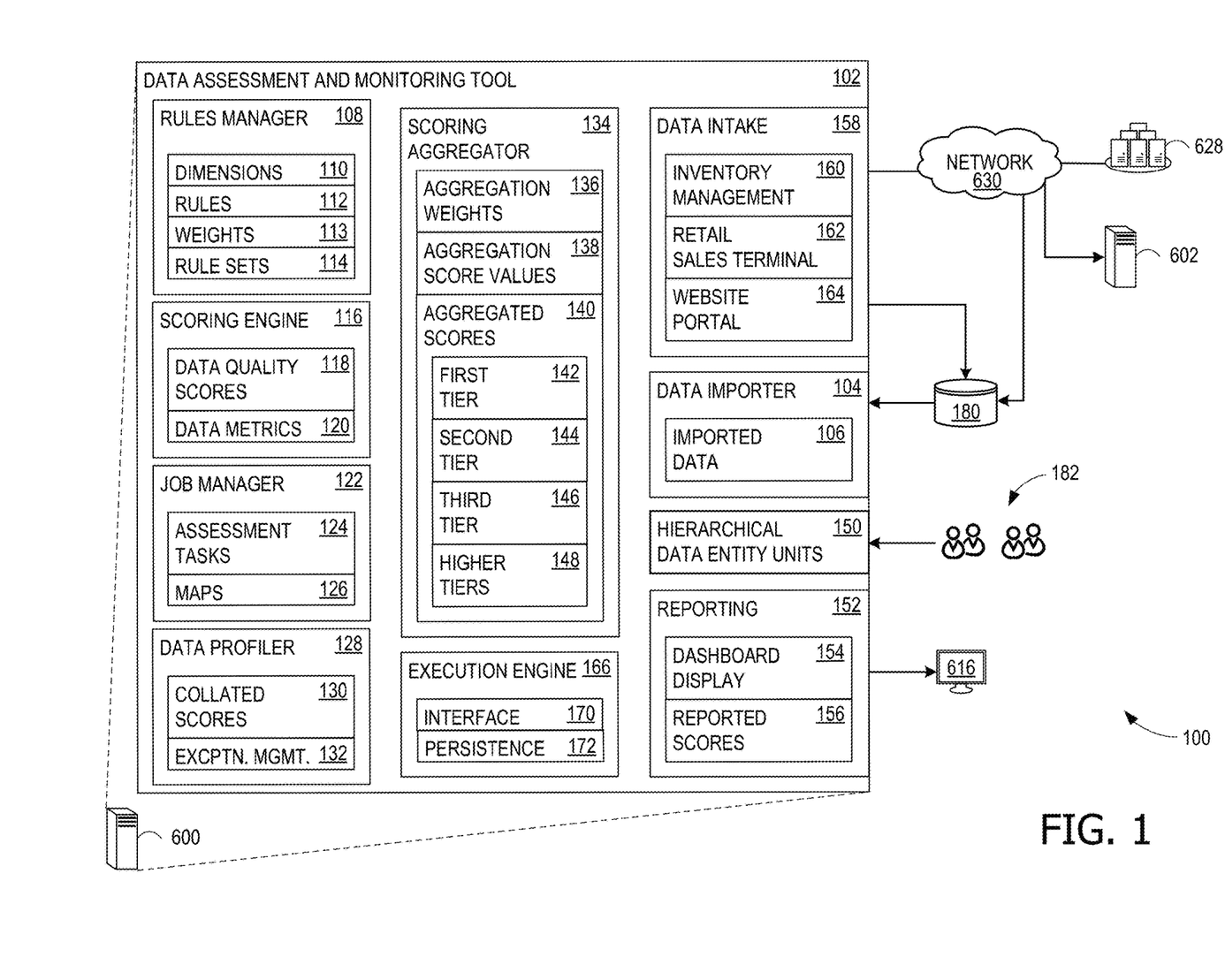
FIG. 1 illustrates an exemplary arrangement for advantageously employing a data quality assessment and monitoring tool.

FIG. 1 illustrates an exemplary arrangement 100 for advantageously employing a data quality assessment and monitoring tool 102. In some examples, the operations described herein for data quality assessment and monitoring tool 102 are performed as computer-executable instructions on one or more computing nodes 600 (which is described in more detail in relation to FIG. 6), and the data sets described herein are stored on one or more computing nodes 600. Data quality assessment and monitoring tool 102 includes a data importer 104 operable to import data (as imported data 106) from a data lake 180. In general, a data lake is an amalgamation of unstructured data, often stored in its source format. Thus, data lake 180 may include raw copies of source data and transformed data used for tasks such as reporting, visualization, analytics and machine learning (ML).

A rules manager 108 is operable to generate rules 112 and rule sets 114 for imported data 106. A data quality rule (in rules 112) is a structured representation of constraints that quantify how good data is. Data quality rules can be customized to include selected dimensions (e.g., completeness, conformity, validity, accuracy, timeliness, duplication, integrity, consistency, and data decay) and weights, which are a measure of the importance of each dimension in a data quality rule. In some examples, each dimension starts with a default weight which can then be customized by each business unit 182, based on the particular importance of that dimension to the business unit 182. Business units 182 are represented within data quality assessment and monitoring tool 102 by hierarchical data entity units 150. Hierarchical data entity units 150 include attributes that qualify specific business entities and are arranged hierarchically similar to an enterprise organizational chart, so that various data consumers can be grouped and sub-grouped according their roles within the enterprise operations.

In this way, dimensions 110, rules 112, and weights 113 can each be customized for the hierarchical data entity units 150. For example, rules 112 which use accuracy, may have higher weight than rules using completeness, and will give a better rating to the dimension metric. In some examples, the weights of 1, 2, 3, 4 are used for rules having four dimensions, since those weights sum to a total potential score of 10, while adhering to the hierarchical concept of dimensions. A grouped set of rules 112 is a rule set (in rule sets 114), for example a grouping of customizes rules 112. Rule sets 114 are therefore also customized by hierarchical data entity units 150.

A scoring engine 116 is operable to generate data quality scores 118 for imported data 106 using rule sets 114. Data quality scores 118 can generally be interpreted as the percentage of non-defect data entries out of all data entries in imported data 106 that are relevant to rule sets 114 for particular hierarchical data entity units 150. In general data quality score can be as score for a particular one of particular hierarchical data entity units 150 (e.g., data quality scores 118) or an aggregated score of hierarchical data entity units 150 (e.g., aggregate data quality scores 140, described below). In some examples, scoring engine 116 is further operable to generate data metrics 120 for imported data 106 and rule sets 114.

A job manager 122 is operable to generate data assessment tasks 124 and map data assessment tasks 124 to rule sets 114 and hierarchical data entity units 150 to generate data quality assessment maps 126. A data assessment task is a logical grouping of hierarchical data entity units 150 and corresponding rule sets 114, which will give a mapping of which rules 112 need to be applied for the hierarchical data entity units 150. Data quality assessment maps 126 provide detailed mapping between hierarchical data entity units 150 and customized rules 112. A data profiler 128 is configured to operate on data assessment tasks 124 and use scoring engine 116 and imported data 106 to produce data quality scores 118 for a plurality of hierarchical data entity units 150, and to further collate data quality scores 118 into collate data quality scores 130 for the plurality of hierarchical data entity units 150. Some examples of data profiler 128 also has an exception management component 132 that handles data exceptions and error conditions within the operations of data quality assessment and monitoring tool 102.

A hierarchical scoring aggregator 134 is operable to aggregate a first set of data quality scores 118 for a first hierarchical data entity unit of the plurality of hierarchical data entity units 150 into a first tier aggregate data quality score 142, to aggregate a second set of the data quality scores 118 for a second hierarchical data entity unit of the plurality of hierarchical data entity units into another first tier aggregate data quality score 142, and to further aggregate the first tier aggregate data quality score 142 for the first hierarchical data entity unit and the first tier aggregate data quality score 142 for the second hierarchical data entity unit into a second tier aggregate data quality score 144. Hierarchical scoring aggregator 134 is further operable to aggregate a plurality of second tier aggregate data quality scores 144 for a plurality of hierarchical data entity units 150 into a third tier aggregate data quality score 146, using differently-customized rules and weights for different hierarchical data entity units in the plurality of hierarchical data entity units. Higher tier scores 148 can further be aggregated using multiple lower tier aggregated scores (e.g., multiple third tier aggregate data quality scores 146). In some examples, aggregating data quality scores into first tier aggregate data quality score 142 comprises using rules 112 and aggregation weights 136 customized for a particular hierarchical data entity unit 150, such that a first hierarchical data entity unit 150 and a second hierarchical data entity unit 150 have differently-customized rules 112 and aggregation weights 136. Aggregation weights 136 and aggregation score values 138 are described in more detail in relation to FIG. 2. In general, any tier of scores in aggregate data quality scores 140 can be rolled up with aggregation weights 136, from business entity level, up through enterprise operational level, as will be described in more detail in relation to FIG. 3.

A reporting component 152 is operable to report a selected one of aggregate data quality scores 140 on a dashboard display 154 as a reported score 156. In some examples, dashboard display 154 is output to a presentation component 616, which is described in more detail in relation to FIG. 6. In some examples, reporting component 152 is further operable to report aggregate data quality scores for a plurality of different tiers (e.g., first tier aggregate data quality scores 142, second tier aggregate data quality scores 144, third tier aggregate data quality score 146, and higher tier scores 148).

A data intake node 158 provides data to data lake 180. In some examples, data intake node 158 comprises at least one node selected from the list consisting of: an inventory management system 160, a retail sales terminal 162, and a website portal 164. In some examples, data intake node 158 is a physically separate computing node 600 or set of computing nodes 600. As illustrated, data intake node 158 is connected to a cloud resource 628 across a network 630. In some examples, cloud resource 628 supplies data to data lake 180 through data intake node 158. In some examples, cloud resource 628 supplies data to data lake 180 directly through network 630. In some examples, a user's personal computing node 602 is connected to website portal 164 across network 630, enabling data intake node 158 to collect and store customer data, such as customer profiles, shopping lists, rewards program data, and other e-commerce data.

An execution engine 166 manages execution of the various components of data quality assessment and monitoring tool 102, for example data importer 104, rules manager 108, scoring engine 116, job manager 122, data profiler 128, hierarchical scoring aggregator 134, reporting component 152, and data intake node 158. A interface 170 permits users in various business units 182 to customize of dimensions 110, rules 112, weights 113, rule sets 114, aggregation weights 136, aggregation score values 138, data assessment tasks 124, and dashboard display 154 according to the particular business needs for consuming imported data 106. A persistence component 172 enables ongoing roll-up score calculations to provide continuously and dynamically updated reported scores 156.

Figure 2:
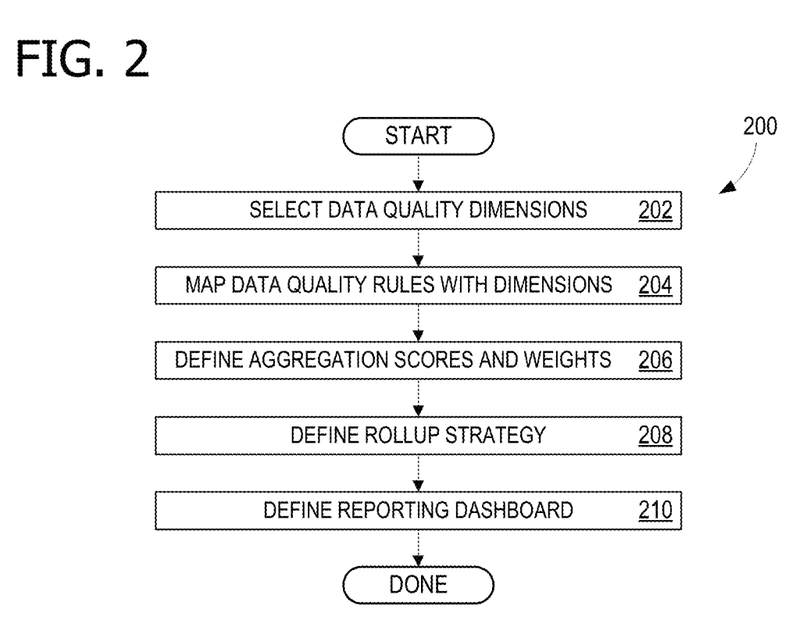
FIG. 2 shows a flow chart of operations associated with the exemplary arrangement of FIG. 1.

FIG. 2 shows a flow chart 200 of operations associated with the exemplary arrangement of FIG. 1. The DQAF implemented as data quality assessment and monitoring tool 102 objectively measures data quality, using multiple broadly-defined stages. Stage 202 selects data quality dimensions 110 and weights 113. Stage 204 maps data quality rules 112 with dimensions 110, weighted by weights 113. Some example rules are provided here: (1) Not Null Check—the user is expecting not null values for the column passed as a parameter; (2) Unique Value Check—the user is expecting all values for the column passed as a parameter as unique: (3) Expression Check—the user can check whether the value of a particular column meets a conditional check (e.g., item_number>1000); (4) Sum of a Column—the user can check whether the sum of a particular column is within a threshold, comparing to its previous value; and (5) Number of records—the user can check whether the number of records is within a threshold, comparing to its previous value.

Stage 206 defines aggregation score values 138 and aggregation weights 136, and the strategy for applying rules 112 to dimensions 110 using weights 113. As an example, an account_name data field is used. A first data quality dimension is the completeness of the account name. The rule passes when there are no null or "0" values in the account-_name field. The rule fails when any record contains a null or "0" value in the account_name field. The score value is set to 1, and the weight is set to 1. A second data quality dimension is the conformance of the account name. The rule passes when all values in the field account_name are alphanumeric and the field contains no more than 10 characters. The rule fails when any values in the field account_name are not alphanumeric or the field is more than 10 characters in length. The score is set to 1 and the weight is set to 2. A third data quality dimension is the validity of the account name. The rule passes when the value of the field account_name matches any single value from a trusted reference table. The rule fails when the value of the field account_name is not found in the trusted reference table. The score is set to 1 and the weight is set to 3. A fourth data quality dimension is the accuracy of the account name. The rule passes when the values of the fields zip_code, open_date, and account_name match in the same record in the trusted reference table. The rule fails when any of the values zip_code, open_date, and account name do not match in the same record in the trusted reference table. If an account name record passes all the rules, the maximum score that account name data entity can obtain is $(1\times1)+(1\times2)+(1\times3)+(1\times4)=10$. If an account name record fails all the rules, the minimum score is zero. In some examples, scores are normalized to a 0 to 100 range.

Stage 208 defines a score rollup strategy, form dimensions, through the different tiers of hierarchical data entity units 150, up through the top enterprise level. More detail will be provided in the description of FIG. 3. Stage 210 defines a reporting strategy, for example, identifying reported scores 156 and other information to make available for dashboard display 154.

Figure 3:
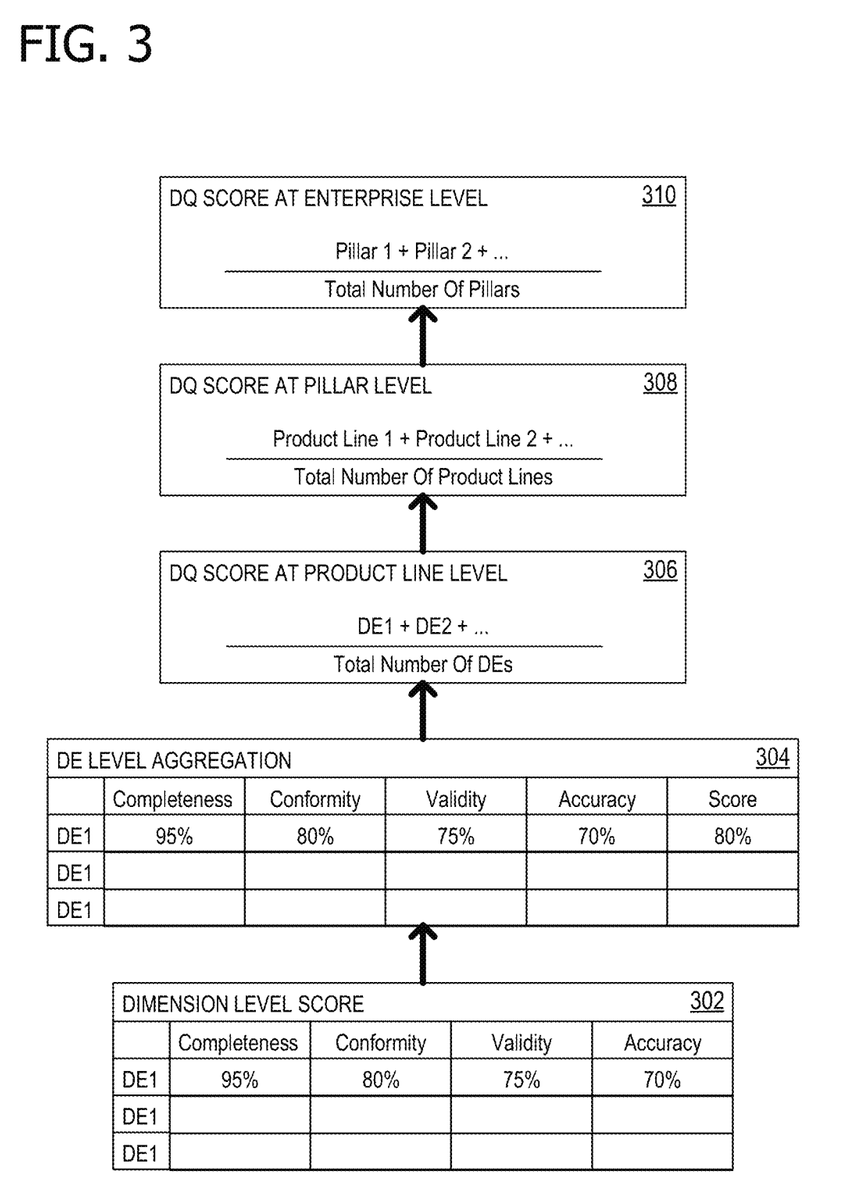
FIG. 3 illustrates an exemplary rollup or aggregation strategy for data quality assessment.

FIG. 3 illustrates an exemplary rollup or aggregation strategy for data quality assessment. A scorecard 302 displays some exemplary data quality scores at a date entity (DE) level for a specific business unit, function, or project. In some examples, a scorecard 302 can be used at the enterprise level to provide an overview of the data quality performance within a large organization. A DE level aggregation 304 computes a score for each DE, using aggregation weights, such as aggregation weights 136. An example score of 80% for DE1 (a first data entity, DE) is a first tier aggregate data quality score 142 (see FIG. 1). DE level aggregation 304 includes scores for multiple DEs.

As the rollup continues, a plurality of DE level aggregation 304 scores are further aggregated into a product line level data quality score 306, which is a second tier aggregate data quality score 144. Further, a plurality of product line level data quality scores 306 are aggregated into a pillar level data quality score 308, which is a third tier aggregate data quality score 146. Finally, a plurality of pillar level data quality scores 308 are aggregated into an enterprise level data quality score 310, which is a higher tier score 148. It should be understood that the framework permits further rollup to an arbitrary number of higher tiers. As each tier, users can set the various aggregation weights 136 that weight the importance of each component of the score calculation for that tier. In general, the tiers and combinations follow the hierarchical structure of hierarchical data entity units 150.

Figure 4:
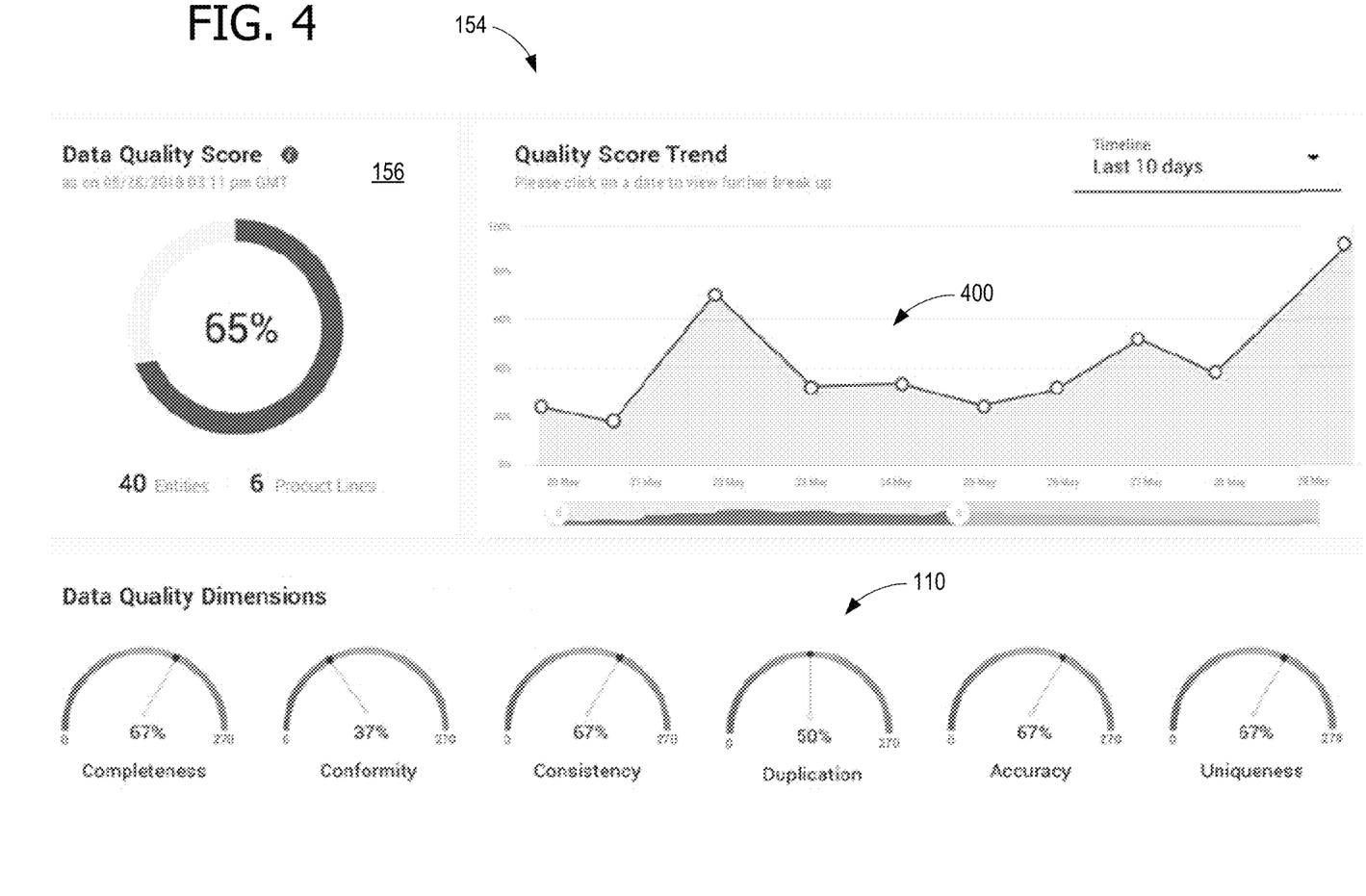
FIG. 4 shows an example dashboard display for the data quality assessment and monitoring tool of FIG. 1.

FIG. 4 shows an example dashboard display 154 for data quality assessment and monitoring tool 102 of FIG. 1. Dashboard display 154 shows reported score 156 and identifies several dimensions 110 that are used in calculating reported score 156. As an example of additional information that can be provided by dashboard display 154, a quality score trend 400 shows the history of reported score 156 during the continuous data assessment and monitoring operations of data quality assessment and monitoring tool 102.

Figure 5:
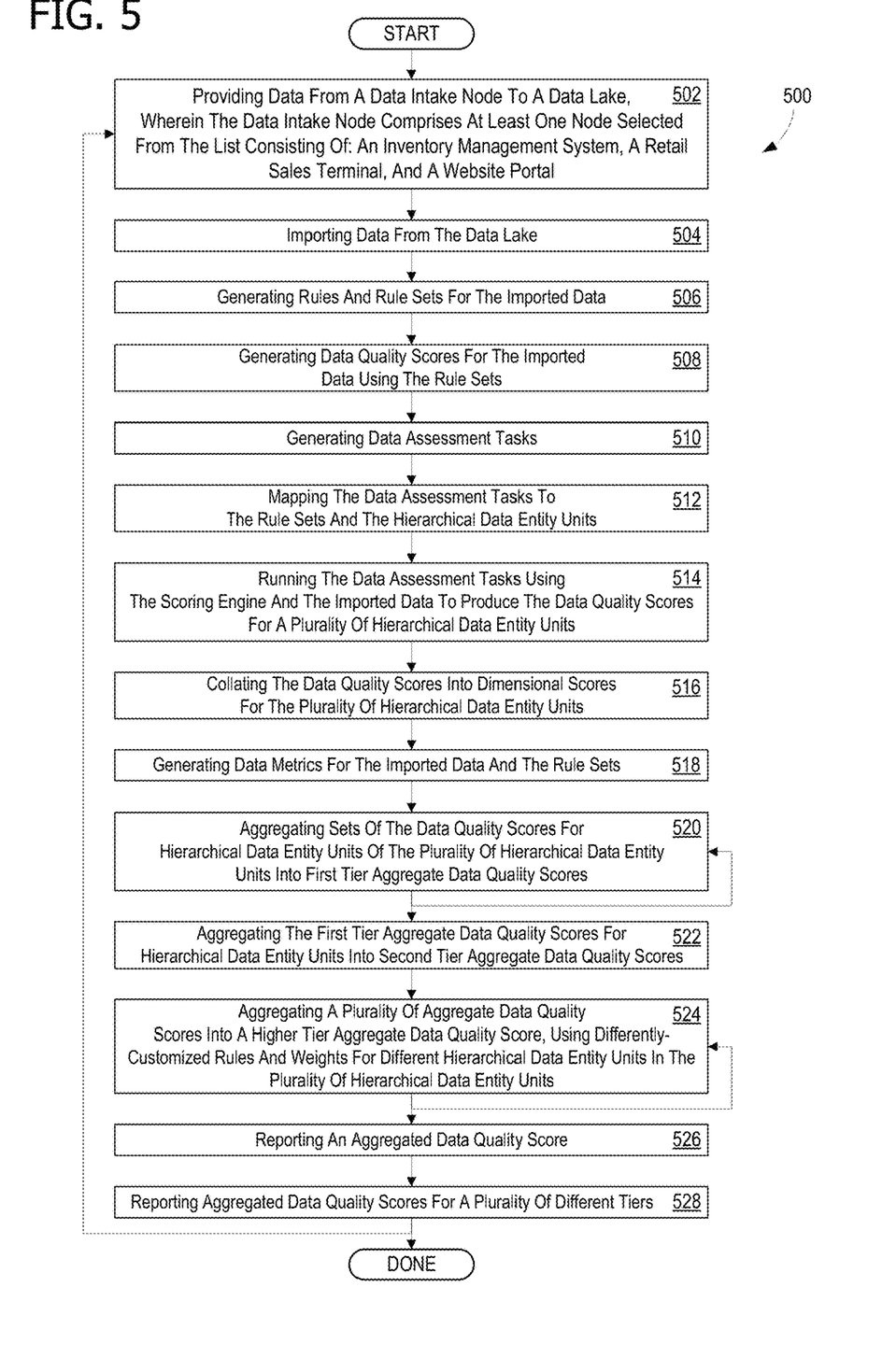
FIG. 5 shows another flow chart of operations associated with the exemplary arrangement of FIG. 1.

FIG. 5 shows a flow chart 500 of operations associated with arrangement 100 (of FIG. 1). In some examples, some or all of flow chart 500 is performed as computer-executable instructions on a computing node 600 (see FIG. 6). Flow chart 500 commences with operation 502, which includes providing data from a data intake node to a data lake, wherein the data intake node comprises at least one node selected from the list consisting of: an inventory management system, a retail sales terminal, and a website portal. Operation 504 includes importing data from the data lake, and operation 506 includes generating rules and rule sets for the imported data, using dimensions and weights. Operation 508 includes generating data quality scores for the imported data using the rule sets, and operation 510 includes generating data assessment tasks. Operation 512 then includes mapping the data assessment tasks to the rule sets and the hierarchical data entity units. Operation 514 includes running the data assessment tasks using a scoring engine and the imported data to produce the data quality scores for a plurality of hierarchical data entity units, and operation 516 includes collating the data quality scores into dimensional scores for the plurality of hierarchical data entity units. Operation 518 then includes generating data metrics for the imported data and the rule sets.

With the data quality scores available, operation 520 includes aggregating sets of the data quality scores for hierarchical data entity units of the plurality of hierarchical data entity units into first tier aggregate data quality scores. In some examples, this involves aggregating a first set of the data quality scores for a first hierarchical data entity unit of the plurality of hierarchical data entity units into a first tier aggregate data quality score. Operation 520 repeats for different hierarchical data entity units, and thus a second iteration includes aggregating a second set of the data quality scores for a second hierarchical data entity unit of the plurality of hierarchical data entity units into a first tier aggregate data quality score, in some examples. In some examples, aggregating data quality scores into a first tier aggregate data quality score comprises using rules and weights customized for a particular hierarchical data entity unit, such that the first hierarchical data entity unit and the second hierarchical data entity unit have differently-customized rules and weights.

Operation 522 includes aggregating the first tier aggregate data quality scores for hierarchical data entity units into second tier aggregate data quality scores. In some examples, this involves aggregating the first tier aggregate data quality score for the first hierarchical data entity unit and the first tier aggregate data quality score for the second hierarchical data entity unit into a second tier aggregate data quality score. Operation 524 then includes aggregating a plurality of aggregate data quality scores into a higher tier aggregate data quality score, using differently-customized rules and weights for different hierarchical data entity units in the plurality of hierarchical data entity units. In some examples, this includes aggregating a plurality of second tier aggregate data quality scores for a plurality of hierarchical data entity units into a third tier aggregate data quality, using differently-customized rules and weights for different hierarchical data entity units in the plurality of hierarchical data entity units. Operation 524 repeats for subsequently higher tiers, as many as are used in arrangement 100.

With the aggregate data quality scores available, operation 526 includes reporting an aggregate data quality score (e.g., with a dashboard display), and operation 528 includes reporting aggregate data quality scores for a plurality of different tiers. Flow chart 500 then returns to operation 502 to provide for continuous data assessment and monitoring.

Exemplary Operating Environment

Figure 6:
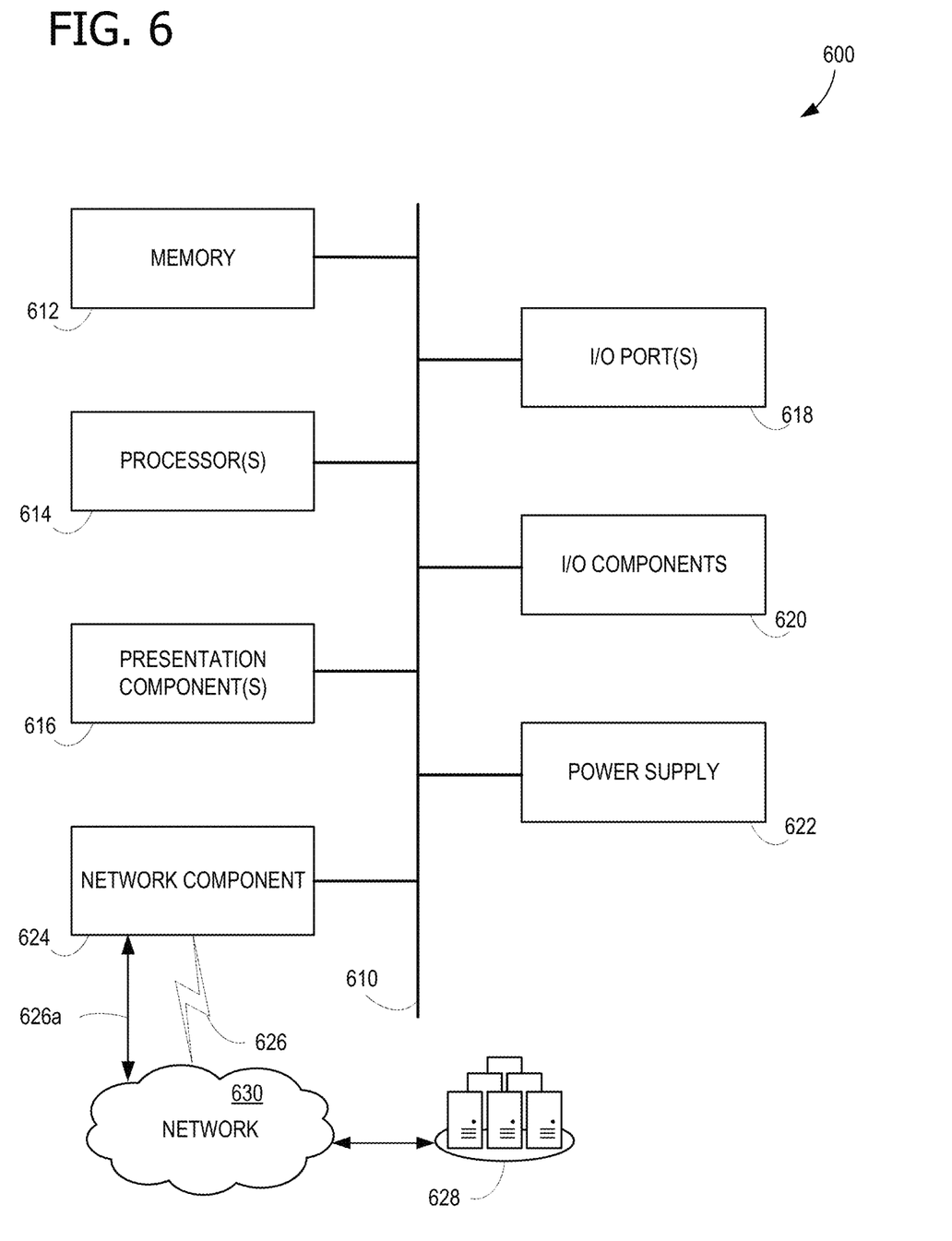
FIG. 6 is a block diagram of an example computing node for implementing aspects disclosed herein.

FIG. 6 is a block diagram of an example computing node 600 for implementing aspects disclosed herein and is designated generally as computing node 600. Computing node 600 is one example of a suitable computing environment and is not intended to suggest any limitation as to the scope of use or functionality of the invention. Neither should the computing node 600 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 630.

Computing node 600 includes a bus 610 that directly or indirectly couples the following devices: memory 612, one or more processors 614, one or more presentation components 616, input/output (I/O) ports 618, I/O components 620, a power supply 622, and a network component 624. Computing node 600 should not be interpreted as having any dependency or requirement related to any single component or combination of components illustrated therein. While computing node 600 is depicted as a seemingly single device, multiple computing nodes 600 may work together and share the depicted device resources. That is, one or more computer storage devices having computer-executable instructions stored thereon may perform operations disclosed herein. For example, memory 612 may be distributed across multiple devices, processor(s) 614 may provide housed on different devices, and so on.

Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 6 is merely illustrative of an exemplary computing node that can be used in connection with one or more embodiments. Distinction is not made between such categories as "workstation," "server," "laptop," "hand-held device," etc., as all are contemplated within the scope of FIG. 6 and the references herein to a "computing node" or a "computing device." Memory 612 may include any of the computer-readable media discussed herein. Memory 612 may be used to store and access instructions configured to carry out the various operations disclosed herein. In some examples, memory 612 includes computer storage media in the form of volatile and/or nonvolatile memory, removable or non-removable memory, data disks in virtual environments, or a combination thereof.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing node 600, or by a processor external to the client computing node 600. In some examples, the processor(s) 614 are programmed to execute instructions such as those illustrated in the flowcharts discussed below and depicted in the accompanying drawings. Moreover, in some examples, the processor(s) 614 represent an implementation of analog techniques to perform the operations described herein. For example, the operations may be performed by an analog client computing node 600 and/or a digital client computing node 600.

Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 600, across a wired connection, or in other ways. Ports 618 allow computing node 600 to be logically coupled to other devices including I/O components 620, some of which may be built in. Example I/O components 620 include, for example but without limitation, a microphone, keyboard, mouse, joystick, game pad, satellite dish, scanner, printer, wireless device, etc.

In some examples, the network component 624 includes a network interface card and/or computer-executable instructions (e.g., a driver) for operating the network interface card. Communication between the computing node 600) and other devices may occur using any protocol or mechanism over any wired or wireless connection. In some examples, the network component 624 is operable to communicate data over public, private, or hybrid (public and private) network 630 using a transfer protocol, between devices wirelessly using short range communication technologies (e.g., near-field communication (NFC). Bluetooth® branded communications, or the like), or a combination thereof. Network component 624 communicates over wireless communication link 626 and/or a wired communication link 626a to a cloud resource 628 across network 630. Various different examples of communication links 626 and 626a include a wireless connection, a wired connection, and/or a dedicated link, and in some examples, at least a portion is routed through the internet.

Although described in connection with an example computing node 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary data quality assessment and monitoring tool comprises: a data importer operable to import data from a data lake; a rules manager operable to generate rules and rule sets for the imported data, using dimensions and weights; a scoring engine operable to generate data quality scores for the imported data using the rule sets; a job manager operable to generate data assessment tasks; a data profiler configured to operate on the data assessment tasks, and use the scoring engine and the imported data to produce the data quality scores for a plurality of hierarchical data entity units, and to further collate the data quality scores into dimensional scores for the plurality of hierarchical data entity units; a hierarchical scoring aggregator operable to aggregate a first set of the data quality scores for a first hierarchical data entity unit of the plurality of hierarchical data entity units into a first tier aggregate data quality score, to aggregate a second set of the data quality scores for a second hierarchical data entity unit of the plurality of hierarchical data entity units into a first tier aggregate data quality score, and to further aggregate the first tier aggregate data quality score for the first hierarchical data entity unit and the first tier aggregate data quality score for the second hierarchical data entity unit into a second tier aggregate data quality score; and a reporting component operable to report an aggregate data quality score.

An exemplary method of data assessment and monitoring comprises: importing data from a data lake; generating rules and rule sets for the imported data; generating data quality scores for the imported data using the rule sets, using dimensions and weights; generating data assessment tasks; running the data assessment tasks using a scoring engine and the imported data to produce the data quality scores for a plurality of hierarchical data entity units; collating the data quality scores into dimensional scores for the plurality of hierarchical data entity units; aggregating a first set of the data quality scores for a first hierarchical data entity unit of the plurality of hierarchical data entity units into a first tier aggregate data quality score; aggregating a second set of the data quality scores for a second hierarchical data entity unit of the plurality of hierarchical data entity units into a first tier aggregate data quality score; aggregating the first tier aggregate data quality score for the first hierarchical data entity unit and the first tier aggregate data quality score for the second hierarchical data entity unit into a second tier aggregate data quality score; and reporting an aggregate data quality score.

One or more computer storage devices has computer-executable instructions stored thereon for data assessment and monitoring, which, on execution by a computer, cause the computer to perform operations comprising: providing data from a data intake node to a data lake, wherein the data intake node comprises at least one node selected from the list consisting of: an inventory management system, a retail sales terminal, and a website portal; importing data from the data lake; generating rules and rule sets for the imported data, using dimensions and weights; generating data quality scores for the imported data using the rule sets; generating data assessment tasks; running the data assessment tasks using a scoring engine and the imported data to produce the data quality scores for a plurality of hierarchical data entity units; collating the data quality scores into dimensional scores for the plurality of hierarchical data entity units; aggregating a first set of the data quality scores for a first hierarchical data entity unit of the plurality of hierarchical data entity units into a first tier aggregate data quality score; aggregating a second set of the data quality scores for a second hierarchical data entity unit of the plurality of hierarchical data entity units into a first tier aggregate data quality score; aggregating the first tier aggregate data quality score for the first hierarchical data entity unit and the first tier aggregate data quality score for the second hierarchical data entity unit into a second tier aggregate data quality score; and reporting an aggregate data quality score.

Alternatively, or in addition to the other examples described herein, examples include any combination of the following:

- the hierarchical scoring aggregator is further operable to aggregate a plurality of second tier aggregate data quality scores for a plurality of hierarchical data entity units into a third tier aggregate data quality score, using differently-customized rules and weights for different hierarchical data entity units in the plurality of hierarchical data entity units;
- aggregating a plurality of second tier aggregate data quality scores for a plurality of hierarchical data entity units into a third tier aggregate data quality score, using differently-customized rules and weights for different hierarchical data entity units in the plurality of hierarchical data entity units;
- the scoring engine is further operable to generate data metrics for the imported data and the rule sets;
- generating data metrics for the imported data and the rule sets;
- the job manager is further operable to map the data assessment tasks to the rule sets and the hierarchical data entity units;
- mapping the data assessment tasks to the rule sets and the hierarchical data entity units;
- aggregating data quality scores into a first tier aggregate data quality score comprises using rules and weights customized for a particular hierarchical data entity unit, such that the first hierarchical data entity unit and the second hierarchical data entity unit have differently-customized rules and weights;
the reporting component is further operable to report aggregate data quality scores for a plurality of different tiers;
reporting aggregate data quality scores for a plurality of different tiers.
a data intake node for providing data to the data lake, wherein the data intake node comprises at least one node selected from the list consisting of: an inventory management system, a retail sales terminal, and a website portal; and
providing data from a data intake node to the data lake, wherein the data intake node comprises at least one node selected from the list consisting of: an inventory management system, a retail sales terminal, and a website portal.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A data quality assessment and monitoring tool comprising:
    a memory storing instructions operative for execution by a processor;
    the processor, coupled to the memory, that executes the instructions stored on the memory;
    a data importer, implemented on the processor, that imports data from a data lake;
    a rules manager, implemented on the processor, that generates rules and rule sets for the imported data, using weights, wherein the rule sets include a first rules and weights and a second rules and weights;
    a scoring engine, implemented on the processor, that:
        generates data quality scores for the imported data using the rule sets, and
        collates the generated data quality scores into one or more dimensional scores, each dimensional score identifying a separate quality of the imported data;
    a job manager, implemented on the processor, that generates data assessment tasks, and
    a data profiler, implemented on the processor, that uses the scoring engine and the imported data to produce the data quality scores for a plurality of hierarchical data entity units including a first hierarchical data entity unit and a second hierarchical data entity unit, and
    a hierarchical scoring aggregator, implemented on the processor, that:
        aggregates a first set of the data quality scores for a first hierarchical data entity unit of the plurality of hierarchical data entity units into a first tier aggregate data quality score, the first hierarchical data entity unit having the first rules and weights, and
        aggregates a second set of the data quality scores for a second hierarchical data entity unit of the plurality of hierarchical data entity units into a first tier aggregate data quality score, the second hierarchical data entity unit having the second rules and weights;
    a persistence component, implemented on the processor, that continually executes an ongoing score rollup strategy to roll up the first tier aggregate data quality score for the first hierarchical data entity unit and the first tier aggregate data quality score for the second hierarchical data entity unit into a second tier aggregate data quality score, and
    a reporting component, implemented on the processor, that dynamically outputs, based on the executed ongoing score rollup strategy continuously updating the first tier aggregate data quality score and the second tier aggregate data quality score for the first hierarchical data entity unit and the second hierarchical data entity unit, respectively, i) one of the first tier aggregate data quality score or the second tier aggregate data quality score and ii) the produced data quality scores, including the one or more dimensional scores, to a dashboard display that also displays the collated one or more dimensional scores.

2. The tool of claim 1 wherein:
    the hierarchical scoring aggregator:
        aggregates updated first and second set of the data quality scores into updated first tier aggregate data quality scores, and
        aggregates a plurality of the second tier aggregate data quality scores for a plurality of hierarchical data entity units into a third tier aggregate data quality score, using differently-customized rules and weights for different hierarchical data entity units in the plurality of hierarchical data entity units,
    the persistence component rolls up the updated first tier aggregatedata quality scores into an updated second tier aggregate data quality score, and
    the reporting component displays one of the updated first tier aggregate data quality score or the updated second tier aggregate data quality score.

3. The tool of claim 1 wherein:
    the scoring engine further generates data metrics for the imported data and the rule sets,
    the data imported from the data lake includes raw copies of source data and transformed data, and
    the one or dimensional scores include one or more of accuracy, completeness, conformity, consistency, data decay, duplication, integrity, timeliness, uniqueness, and validity.

4. The tool of claim 1 wherein the job manager further maps the data assessment tasks to the rule sets and the hierarchical data entity units.

5. The tool of claim 1 wherein:
the first rules and weights and the second rules and weights are customized for a particular hierarchical data entity unit, and
the first tier aggregate data quality score measures an aggregate quality of data in the first tier and the second tier aggregate data quality score measures an aggregate quality of data in the second tier.

6. The tool of claim 1 wherein:
the reporting component further reports aggregate data quality scores for a plurality of different tiers including a first tier and a second tier,
the first tier represents particular data entities, and
the second tier represents product line levels.

7. The tool of claim 1 further comprising:
a data intake node for providing data to the data lake, wherein the data intake node comprises at least one node selected from the list consisting of:
an inventory management system, a retail sales terminal, and a website portal.

8. A method of data assessment and monitoring, the method comprising:
importing, by a processor, data from a data lake;
generating, by the processor, rules and rule sets for the imported data, using weights, wherein the rule sets include a first rules and weights and a second rules and weights;
generating, by the processor, data quality scores for the imported data using the rule sets;
collating the generated data quality scores into one or more dimensional scores, each dimensional score identifying a separate quality of the imported data;
generating, by the processor, data assessment tasks;
running, by the processor, data assessment tasks using a scoring engine and the imported data to produce the data quality scores for a plurality of hierarchical data entity units including a first hierarchical data entity unit and a second hierarchical data entity unit;
aggregating, by the processor, a first set of the data quality scores for a first hierarchical data entity unit of the plurality of hierarchical data entity units into a first tier aggregate data quality score, the first hierarchical data entity unit having the first rules and weights;
aggregating, by the processor, a second set of the data quality scores for a second hierarchical data entity unit of the plurality of hierarchical data entity units into a first tier aggregate data quality score, the second hierarchical data entity unit having the second rules and weights;
continually executing an ongoing score rollup strategy to roll up the first tier aggregate data quality score for the first hierarchical data entity u nit and the first tier aggregate data quality score for the second hierarchical data entity unit into a second tier aggregate data quality score
dynamically outputting, by the processor based on the executed ongoing score rollup strategy continuously updating the first tier aagregate data quality score and the second tier aagregate data quality score for the first hierarchical data entity unit and the second hierarchical data entity unit, respectively, i), one of the first tier aggregate data quality score or the second tier aggregate data quality score and ii) the produced data quality scores, including the one or more dimensional scores, to a dashboard display that also displays the collated one or more dimensional scores.

9. The method of claim 8 further comprising:
aggregating a plurality of second tier aggregate data quality scores for a plurality of hierarchical data entity units into a third tier aggregate data quality score, using differently-customized rules and weights for different hierarchical data entity units in the plurality of hierarchical data entity units.

10. The method of claim 8 further comprising:
generating data metrics for the imported data and the rule sets.

11. The method of claim 8 further comprising:
mapping the data assessment tasks to the rule sets and the hierarchical data entity units.

12. The method of claim 8 wherein the first rules and weights and the second rules and weights are customized for a particular hierarchical data entity unit.

13. The method of claim 8 further comprising:
reporting aggregate data quality scores for a plurality of different tiers.

14. The method of claim 8 further comprising:
providing data from a data intake node to the data lake, wherein the data intake node comprises at least one node selected from the list consisting of:
an inventory management system, a retail sales terminal, and a website portal.

15. One or more computer storage devices having computer-executable instructions stored thereon for data assessment and monitoring, which, on execution by a computer, cause the computer to perform operations comprising:
providing data from a data intake node to a data lake, wherein the data intake node comprises at least one node selected from the list consisting of:
an inventory management system, a retail sales terminal, and a website portal;
importing data from the data lake;
generating rules and rule sets for the imported data, using weights, wherein the rule sets include a first rules and weights and a second rules and weights;
generating data quality scores for the imported data using the rule sets;
collating the generated data quality scores into one or more dimensional scores, each dimensional score identifying a separate quality of the imported data;
generating data assessment tasks;
mapping the generated data assessment tasks to the rule sets and a plurality of hierarchical data entity units to generate a data quality assessment map, the data quality assessment map providing a detailed mapping between the hierarchical data entity units and the rule sets;
running the mapped data assessment tasks using a scoring engine and the imported data to produce the data quality scores for the plurality of hierarchical data entity units;
collating the data quality scores into dimensional scores for the plurality of hierarchical data entity units;
aggregating a first set of the data quality scores for a first hierarchical data entity unit of the plurality of hierarchical data entity units into a first tier aggregate data quality score, the first hierarchical data entity unit having the first rules and weights;
aggregating a second set of the data quality scores for a second hierarchical data entity unit of the plurality of hierarchical data entity units into a first tier aggregate data quality score, the second hierarchical data entity unit having the second rules and weights;

continually executing an ongoing score rollup strategy to roll up the first tier aggregate data quality score for the first hierarchical data entity unit and the first tier aggregate data quality score for the second hierarchical data entity unit into a second tier aggregate data quality score; and dynamically outputting, based on the executed ongoing sore rollup strategy continuously updating the first tier aggregate data quality score and the second tier aggregate data quality score for the first hierarchical data entity unit and the second hierarchical data entity unit, respectively, i) one of the first tier aggregate data quality score or the second tier aggregate data quality score and ii) the produced data quality scores, including the one or more dimensional scores, to a dashboard display that also displays the collated one or more dimensional scores.

16. The one or more computer storage devices of claim 15 wherein the operations further comprise:

aggregating a plurality of second tier aggregate data quality scores for a plurality of hierarchical data entity units into a third tier aggregate data quality score, using differently-customized rules and weights for different hierarchical data entity units in the plurality of hierarchical data entity units.

17. The one or more computer storage devices of claim 15 wherein the operations further comprise:

generating data metrics for the imported data and the rule sets.

18. The one or more computer storage devices of claim 15 wherein the operations further comprise:

mapping the data assessment tasks to the rule sets and the hierarchical data entity units.

19. The one or more computer storage devices of claim 15 wherein the first rules and weights and the second rules and weights are customized for a particular hierarchical data entity unit.

20. The one or more computer storage devices of claim 15 wherein the operations further comprise:

reporting aggregate data quality scores for a plurality of different tiers.

* * * * *